United States Patent [19]

Quet et al.

[11] Patent Number: 4,658,710
[45] Date of Patent: Apr. 21, 1987

[54] PORTABLE BARBECUE

[76] Inventors: Hector P. Quet, 6203 Denny St., North Hollywood, Calif. 91606; Rowland A. Selame, 15224 Cantara St., Panorama City, Calif. 91402

[21] Appl. No.: 822,398

[22] Filed: Jan. 27, 1986

[51] Int. Cl.⁴ .............................................. A47J 37/07
[52] U.S. Cl. ...................................... 99/445; 99/446; 99/450; 126/25 A
[58] Field of Search ................ 99/385, 393, 400, 422, 99/445, 446, 450; 126/25 R, 25 A

[56] References Cited
U.S. PATENT DOCUMENTS

| | | | |
|---|---|---|---|
| 3,199,503 | 8/1965 | Hanson | 126/25 R |
| 3,981,233 | 9/1976 | Nugarus | 99/422 |
| 4,462,306 | 7/1984 | Eisendrath | 99/446 X |
| 4,541,406 | 9/1985 | Dasambiagio | 99/446 X |

Primary Examiner—Billy J. Wilhite
Attorney, Agent, or Firm—Roger A. Marrs

[57] ABSTRACT

A portable barbecue is disclosed herein having an enclosed, hooded grill with an exhaust chimney intended to eliminate much of the smoke and flame normally encountered during a barbecue cooking procedure. The grill is provided with a plurality of V-shaped channels for catching and transporting fats and juices from the cooking meat. A collector pan is carried along one end of the grill to receive the juices from the channels. The coals are disposed directly under the grill and a manual or motor drive is employed to raise and lower the grill with respect to the coal bed. A stabilizing ring on the grill encircling a rod maintains the grill in a substantially horizontal condition.

5 Claims, 5 Drawing Figures

U.S. Patent  Apr. 21, 1987  4,658,710
FIG. 1.
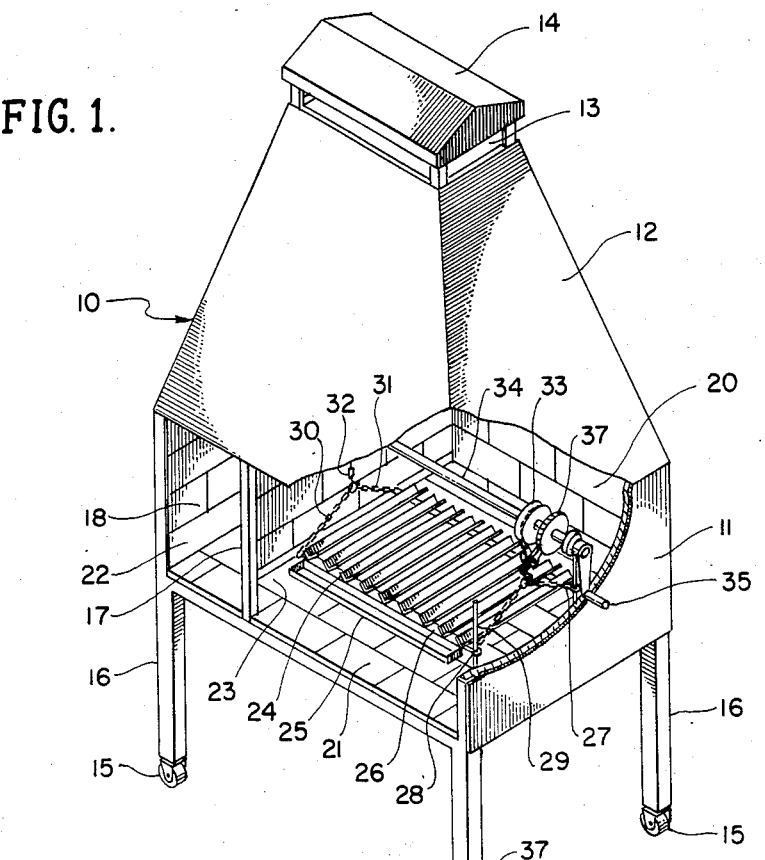
FIG. 2.
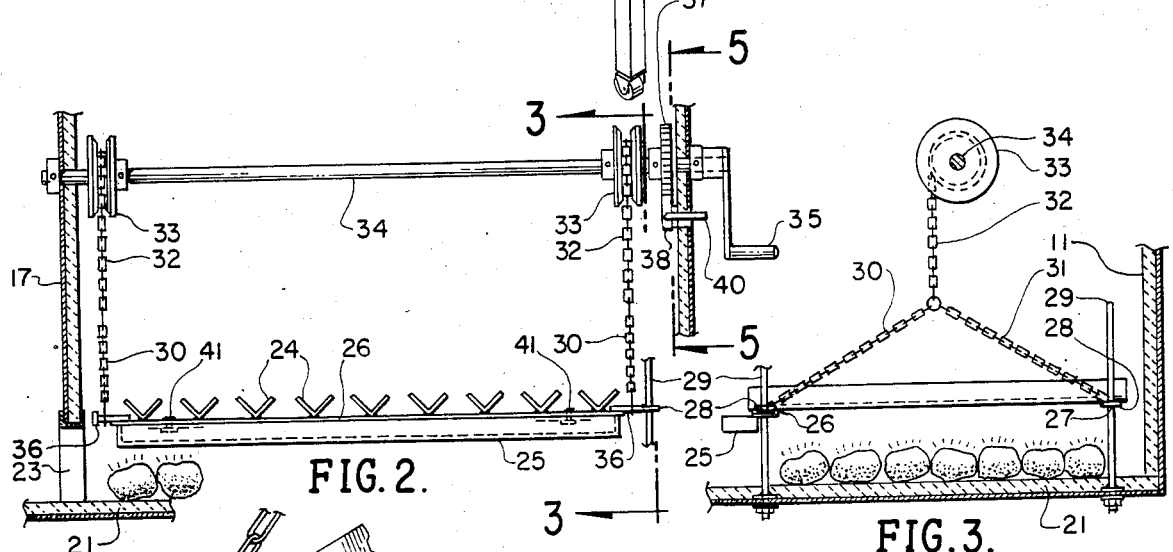
FIG. 3.
FIG. 4.
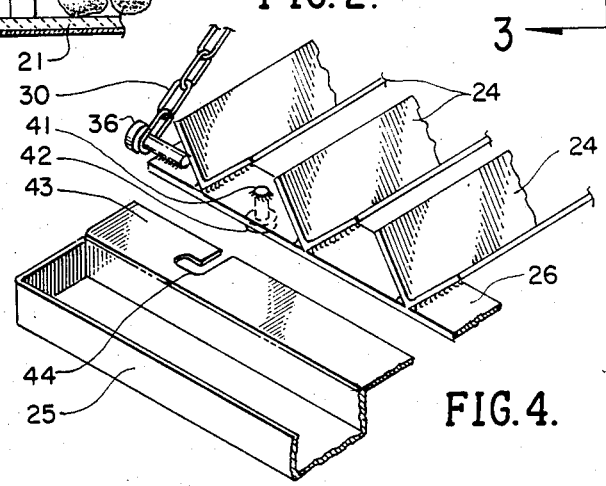
FIG. 5.
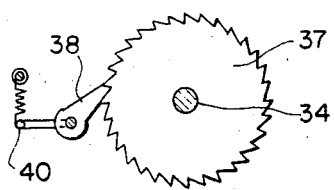

PORTABLE BARBECUE

BACKGROUND OF THE INVENTION

1. Field of the Invention

The present invention relates to cooking apparatus and, more particularly, to a novel portable barbecue having a cooking meat supporting means incorporating a channeled collector for cooking juices and fats and for conducting the same to a collector pan for disposal. All of the above reside in an enclosure having a fire bed and a chimney.

2. Brief Description of the Prior Art

In the past, it has been the conventional practice to place meat and other food products on a flat grill composed of parallel spaced apart rods or bars so that the fats, greases or juices will drip onto the underlying coal bead. Generally, this is done to create a slight smoke or vapor which will penetrate into the meat for enhancing its taste and flavor. However, such a practice tends to produce thick and heavy smoke as well as frequent outbursts of uncontrollable flames. The person using the cooking apparatus is often inadvertently affected by the smoke and flames to the point of illness and/or injury. It is also thought that the by-products of such processes are highly carcinogenic or cancer-causing. Additionally, the process is smelly and makes a mess of all of the implements used in the cooking procedure. The grill and utensils are coated with burned grease and soot which requires difficulty in the removal procedure.

Therefore, a long standing need has existed to provide a barbecue cooking apparatus which promotes the collection and removal of undesired meat drippings or the like.

SUMMARY OF THE INVENTION

Accordingly, the above problems and difficulties are obviated by the present invention which provides an enclosure with an upright, truncated pyramidal hood terminating in a chimney opening. The enclosure supports a fire bed over which a meat carrying grid is movably disposed. The grid includes a plurality of V-shaped channels leading along one side to a collector pan whereby oils and greases may drain from the channels into the collector pan. Means are provided for raising and lowering the grid with respect to the fire bed and further means are provided between the enclosure and the grid for stabilizing the grid to prevent tilting or tipping beyond the point necessary for draining the V-shaped channels.

Therefore, it is among the primary objects of the present invention to provide a novel portable barbecue having an enclosure movably supporting a grid capable of collecting meat drippings or the like and conducting such to a collection pan for subsequent disposal.

Another object of the present invention is to provide a novel portable barbecue having an enclosure with an upright hood terminating in a chimney for removing smoke and fumes from the immediate cooking area.

Still another object of the present invention is to provide a novel means for use with a barbecue permitting the collection and temporary storage of fats, greases and oils which accumulate from meat or the like during a cooking procedure so that such a collection may be subsequently disposed of.

Another object of the present invention is to provide a novel portable barbecue having a wheeled enclosure so that the device may be moved from place to place and which incorporates means for protecting the user from fumes and outbursts of flames.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of the novel portable barbecue incorporating the present invention having a portion of the enclosure and hood broken away to illustrate the internal parts and components;

FIG. 2 is a longitudinal cross sectional view of the portable barbecue apparatus shown in FIG. 1 illustrating the collecting channels and collector pan;

FIG. 3 is a transverse cross sectional view of the grid as taken in the direction of arrow 3—3 of FIG. 2;

FIG. 4 is an exploded perspective view showing the interconnection between the collector channels and the collector pan; and FIG. 5 is a transverse cross sectional view of the grid raising and lowering means shown in FIG. 2 as taken in the direction of arrows 5—5 thereof.

DESCRIPTION OF THE PREFERRED EMBODIMENT

The portable barbecue of the present invention is shown in the general direction of arrow 10 which includes a rectangular housing or enclosure 11 having a hood 12 carried on top of the housing which is of a truncated pyramidal shape terminating at its top in a chimney comprising an opening 13 covered by a lid 14. The housing 11 is mounted on legs carried at each corner thereof and each leg terminates in a roller such as roller 15 carried on the end of leg 16.

The interior of the housing 11 is divided by a partition 17 into a first compartment 18 and a second compartment 20. A common floor or bottom 21 is coextensive between the first and second compartments. The sidewall of the housing 11 includes an opening 22 so that fuel such as charcoal or the like may be placed on the bottom 21 in the first compartment. While in a pile, the coals may be started and permitted to burn so as to establish a desirable fire bed. By employing a pusher tool or implement, the readied coals can now be introduced into the second compartment 20 by pushing the coals through an elongated opening 23 in the partition 17. In this manner, the readied coals can be placed within the second compartment ready for cooking of food.

FIG. 1 further illustrates a means for supporting food such as meats to be cooked which takes the form of a grid composed of a plurality of V-shaped channels such as channel 24 which are designed to empty juices, greases, oils or the like into a collection pan 25 which is removably carried along one end of the channels. The plurality of channels are mounted between support rods 26 and 27 which are arranged in parallel fixed spaced apart relationship. The opposite ends of each of the rods 26 and 27 are respectively connected to the opposite ends of chains such as chains 30 and 31 which are joined to a common lifting chain 32. It is understood that the chain arrangement 30, 31, and 32 are repeated on the opposite end of the grid from the end carrying the numerical characters.

Means are provided for manually or, if desired using a motor means, for raising or lowering the grid with respect to the coals or fire bed. In one form of the invention, the ends of the lifting chain 32 are carried in a sheave such as sheave 33. The sheaves are mounted close to the opposite ends of a turning rod 34 having its opposite ends rotatably carried on the sidewalls of the housing 11 and partition wall 17. The turning rod 34 is actuated by means of a manual crank handle 35, or motor means may be added to it for automatic operation.

Referring now in detail to FIGS. 2 and 3, it can be seen that one end of the grid is supported by the rod or bar 26 and that the chains are connected to the rod or bar by intermediate pins such as pin 36 connected to the end of chain 30. Also, it can be seen that the grid is stabilized or prevented from undue tilt or tipping by means of a pair of rings, such as ring 28, through which a stationary rod 29 passes. Since the ring 28 is carried on the end of the bar 26 or the hook supporting thereon, as the grid moves up and down, the ring will slide over the rod 29. Only a certain amount of tilt will be permitted before binding occurs to prevent further tipping of the grid. For a smooth operation, a second ring and rod arrangement is shown on the other side of the grid as seen in FIG. 3.

Also, it can be seen that the raising and lowering means for the grid takes the form of a tooth ratchet gear 37 carried on the turning rod 34 that operates in conjunction with a spring biased holding pawl 38 pivotally mounted on the wall of housing 11. An L-shaped pin 40 extending from the pawl 38 and the sidewall of housing 11 permits the disengagement of the pawl 38 from the ratchet gear 37.

Referring now in detail to FIG. 4, it can be seen that the pan 25 is removably carried under the bar 26 by means of a pin 41 which is provided with an enlarged head 42 downwardly depending from the underside of the bar 26. Sufficient space is provided between the underside of the bar and the head 42 for accommodating the thickness of a flange 43 carried on one side of the pan 25. The flange 43 is provided with a slot 44 having an enlargement at its end so that the pin 41 may be slid into the slot and the pan moved laterally to support the pan from the bar 26. Although FIG. 4 shows one pin in slot arrangement at one end of the grid, it is to be understood that a similar arrangement is provided at the opposite end of the grid. Also, it is to be noted that the ends of the channels are open so that any fluids collected therein will flow into the pan 25 when the grid is slightly tilted. Tilting may be easily achieved by placing more food weight on the pan side of the grid than on its opposite side or by placing the food product off-center in favor of the pan side of the grid. The ring and rod arrangement, previously described, will prevent undue tilting or complete tipping of the grid while in use.

As shown in FIG. 5, the ratchet wheel 7 will turn in one direction such as in a clockwise direction while the ratchet pawl or holding tooth 38 will engage each tooth along the periphery of the wheel. To reverse direction, the L-shaped pin 40, previously described with respect to FIG. 2, will be pushed downward and the pawl 38 withdrawn from engagement with the teeth so that the turning shaft or rod 34 is free to move.

In view of the foregoing, it can be seen that the barbecue of the present invention is portable in that it may be moved from place to place on its rollers. Undesirable smoke, heat and other vapors or fumes are directed away from the food and the cooking area by means of the hood and the chimney. The juices and greases will be collected by the plurality of V-shaped channels and then poured into a collecting pan 25 which, when removed, can be carried to a safe place for disposal. Simple washing will clean the pan 25 and it can be returned to its operative position on the pins 41 on the grid.

The means for moving the grid in an up and down orientation is provided either manually or by motor and is substantially under control of the ratchet and holding tooth arrangement shown in FIG. 5.

An important aspect of the present invention is coating the V-shaped channels and the pan 25 with a plastic or plastic-like material such as Teflon. Such a coating will prevent any burnt particles, oils or greases from sticking onto the grid components and cleaning can be acheived by easily rinsing off or washing the components.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a portable barbecue useful in removing fumes and catching oils and greases, the combination which comprises:
   a housing having a fire bed;
   a grid movably mounted on said housing for movement towards and away from said fire bed;
   said grid including a plurality of V-shaped channels arranged in a parallel series across said fire bed in close spaced apart relationship;
   a collection pan removably carried on said grid along one side of said plurality of channels for collecting oils, greases or the like gathered on said channels from supported foods;
   said grid includes a plastic-like coating covering said channels and said pan;
   said housing includes a hood of truncated pyramid configuration terminating in a chimney for exhausting fumes and gases;
   said housing is divided into a first and a second compartment by a central partition; and
   said housing and said partition; each having aligned openings for the passage of fuel from one compartment to the other.

2. The invention as defined in claim 1 wherein:
   said grid includes stabilizing means loosely coupling said grid to said housing allowing minimum titling for drainage purposes of said channels.

3. The invention as defined in claim 2 wherein:
   said stabilizing means includes a ring fixed to said grid and a rod fixed to said housing slidably passing through said ring.

4. The invention as defined in claim 3 including:
   means for raising and lowering said grid respective to said fire bed including releasable holding means for maintaining said grid at a desired distance from said fire bed.

5. The invention as defined in claim 4 wherein:
   said grid further includes a pair of cross members in spaced apart relationship fixly secured to opposite ends of each of said channels; and
   pin and slot means cooperatively carried on one of said cross members and said pan respectively constituting a removable means for detachably coupling said pan to said one member.

* * * * *